United States Patent

[11] 3,624,305

[72] Inventor George Verbaas
Brockville, Ontario, Canada
[21] Appl. No. 54,138
[22] Filed July 13, 1970
[45] Patented Nov. 30, 1971
[73] Assignee GTE Automatic Electric Laboratories Incorporated
Northlake, Ill.

[54] COMMUNICATION SWITCHING NETWORK HOLD AND EXTRA CONTROL CONDUCTOR USAGE
13 Claims, 10 Drawing Figs.

[52] U.S. Cl. .......... 179/18 E, 179/175.2 C
[51] Int. Cl. .......... H04q 3/42, H04m 3/22
[50] Field of Search .......... 179/18 E, 18 EB, 18 ES

[56] References Cited
UNITED STATES PATENTS 3,487,173 12/1969 Duthie et al. .......... 179/18 ES

*Primary Examiner*—William C. Cooper
*Attorneys*—Cyril A. Krenzer, K. Mullerheim and B. E. Franz

ABSTRACT: A common control switching system with a network having a main section for line to line and trunk connections and an auxiliary portion for register and sender connections. The terminal stage of the network has a multiple to both the originating and terminating sides of the main portion and to the auxiliary portion. For outgoing calls the connections are set up with the calling line having a double connection to the register and to the originating side of the main network, and the trunk circuit is set up with a double connection to the sender and to the terminating side of the network. In the auxiliary portion, diodes are provided in the hold conductor at the inlet side of each 1XN switch to permit the register and sender connections to be initially held by ground potential from the register and sender circuits respectively and subsequently released, while ground on the hold conductor in the main portion of the network holds that connection.

The terminating junctors in the main portion of the network provide for call supervision for a local mode with a transmission bridge, and a trunk mode and a test mode with metallic switch through. The test mode operates a test-call relay for splitting the hold conductor between the originating and terminating parts of the network, and an extra control conductor through the originating section is connected via make contacts of the test-call relay and the hold conductor of the terminating section to the cutoff relay of a line circuit, to thereby permit making a busy test for test and verification calls, and also to control the cutoff relay for tests from a common test set.

INVENTOR
GEORGE VERBAAS

BY
Bernard E. Franz
ATTORNEY

COMMUNICATION SWITCHING NETWORK HOLD AND EXTRA CONTROL CONDUCTOR USAGE

BACKGROUND OF THE INVENTION

1. Field of The Invention

This invention relates to the usage of the hold and extra control conductors of the switching network of a communication switching system; and more particularly to holding a connection involving registers and senders, and also to test and verification connections for monitoring a subscriber line circuit which may be busy or idle.

2. Description Of The Prior Art

In common control switching systems it is required that an initial connection be established from a calling line to a register, and that after completion of dialing a main connection be established from the calling line to the called line. In addition for outgoing trunk calls, sender connections may be required either from composite register-senders or from a separate pool of senders. In many switching network trunking plans, originating junctor circuits are provided at links at an intermediate point of the network, with branches from the junctors for connections to registers and senders. However, in many situations a more efficient trunking plan may be realized if the register and sender connections are established to the line or trunk circuit terminals. One way in which this may be realized is to release the register and sender connections before establishing the main connection between a calling line circuit and an outgoing trunk circuit, but this increases the marker holding time and may require reserving a path to insure that the connection can be established when required. Another possibility is to provide separate terminals at each line and trunk circuit, one terminal for the main connection and another terminal for the register or sender connection, with the obvious disadvantage of increasing the size of the network. A plan involving double connections at the same line or trunk terminal usually involves difficulty in establishing and holding the connection and selectively releasing one connection while holding the other.

Most switching networks provide for the switching of a pair of transmission conductors which may be designated + and −, tip and ring, or *a* and *b*, respectively. There is also a hold conductor for holding the switching devices of the network after the connection is established and also for holding the cutoff relays in the line and trunk circuits, this conductor being designated as the hold, sleeve, or C conductor. Some portions of the network may also be equipped with an "extra control" (EC) conductor for providing various functions.

In many switching systems, a special portion of the switching network is provided for test and verification connections to line circuits, which provide a metallic path for the transmission conductors without any direct current potentials, and provide for testing the hold conductor at the line circuit to determine whether it is busy or idle, with the possibility of operating the cutoff relay if the circuit is idle. This connection to the cutoff relay must be separate from the hold path for the switching devices in the network. For example, in the typical step-by-step switching system, a test connector uses the hold conductor for holding the connector and the preceding switch train, and an extra control conductor is connected via the wiper and bank contacts to the hold conductor of the line circuit, this extra control conductor being connected as a fourth conductor through the preceding selectors to the test or verification circuit to provide a busy or idle test as indicated by presence or absence of ground potential, and also providing a path for supplying ground potential to operate the cutoff relay. In common control switching systems it would be desirable to provide for test and verification calls for the main switching network to avoid providing the special portion of the network, but it would not be economical to provide a fourth or extra control conductor to all of the subscriber line circuits.

SUMMARY OF THE INVENTION

One object of the invention is to provide a simple and effective arrangement for providing simultaneous connections to registers and senders from line and trunk connections respectively, along with the connection between the line and trunk circuit.

In the network trunking plan according to the invention the line and trunk circuits have a single terminal with a multiple to switching devices for originating and terminating connections via the main network, with the same multiple to other switching devices for register and sender connections. This common multiple includes a hold conductor from the cutoff relay and to the holding paths of both sets of switching devices, with holding ground supplied from the main portion of the network for its devices, and from the registers and senders for the devices in that portion of the network. According to the invention a diode is provided in the hold conductor at the terminal stage of the register-sender portion of the switching network which provides isolation so that connections may be established to the registers and senders and held by ground on the hold conductor from those circuits, and a simultaneous connection may be established from a line to a trunk circuit with its own holding ground, so that the register and sender connections may be released by removing their holding ground.

A terminating junctor in the main switching network is arranged to split the transmission conductor path, and also an extra control conductor is provided, at the time the connection is initially established, and by a later command from a marker the connection is switched through after the register and sender are released.

Another object of the invention is to provide for test and verification calls via the main network, with a minimum of special equipment for this type of call.

According to the invention a universal supervisory junctor (terminating junctor) circuit is provided which on local calls provides a transmission bridge, and on trunk calls as well as test and verification calls provides a metallic path for the transmission conductors. In particular, according to the invention the supervisory junctor is provided with a test and verification relay which is operated in response to a particular command via the marker, the contacts of this relay being used to split the hold conductor so that one part holds the switching devices in the network including the device between the junctor and the called line circuit, and the other part of the hold conductor is switched to the extra hold control conductor to provide for the busy test and control of the cutoff relay from the test and verification circuit.

Other aspects of the invention relate to further details of the terminating junctor which is used for call supervision on local calls, on trunk calls, and on test and verification calls, as determined by instructions received from the central processing unit via the marker.

CROSS-REFERENCES TO RELATED APPLICATION

This invention may be incorporated in the Small Exchange Stored Program Switching System described in U.S. Pat. No. 3,487,173 by R. W. Duthie and R. M. Thomas.

The switching network sues a switching mechanism with some modifications of the type described in the H. P. Boswau U.S. Pat. No. 2,573,889 issued Nov. 6, 1951 for Automatic Telephone Switching Mechanism.

DESCRIPTION OF THE PREFERRED EMBODIMENT

Figure 1:
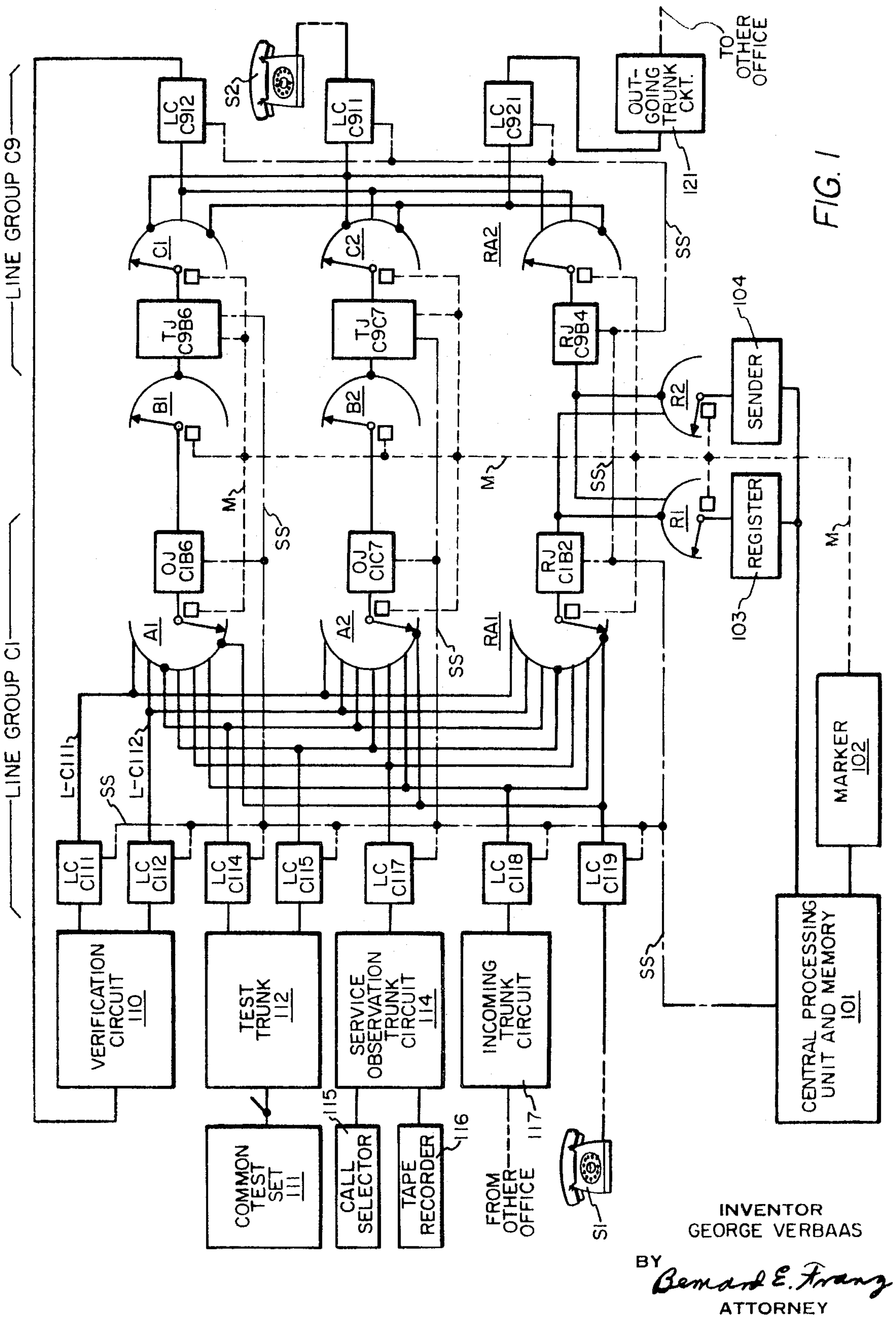
FIG. 1 is a single-line block and symbolic drawing representing a portion of the switching network and circuits associated therewith.

An early embodiment of the system in which the invention has been incorporated is described in the Duthie et al. patent. In FIG. 1, the central processing unit and memory of the system are represented by block 101 and the marker is represented by block 102. This figure shows some of the switches of the network symbolically, with the terminal and junctor circuits associated with the network represented by blocks. The network switching devices and junctor circuits of FIG. 1 are shown schematically in FIGS. 3,4, 6 and 7.

The switching network uses a switching mechanism with some modifications of the type described in the H. P. Boswau U.S. patent. The basic device of the network is a "switch" for connecting a three or four conductor line between a single inlet and any one of a hundred outlets, that is, it is a 1×100 matrix. Any number of these switches up to 32 are mounted on a "gate" having 100 sets of bars, with three or four bars in a set, extending through the switches. Each switch has 10 tens relays, 10 units relays, and one allotter relay. Each gate also includes 20 or 40 allotter bars extending through the switches, the tens and units relays in each switch having their windings individually connected to contacts of the allotter relay for connection, upon operation of the allotter relay, directly to the allotter bars. Operation of the switch requires operation of one tens relay and one units relay via contacts of the allotter relay to connect the single input to the bars for one of the outlets, the tens and units relays being held subsequent to the release of the allotter relay via ground potential on a control conductor which is one of the bars of the set.

While the Boswau switching mechanism is used in the preferred embodiment, other mechanisms may be used within the scope of the invention, such as two-motion stepping switches, rotary switches, crossbar mechanisms, or relay crosspoint matrices. In each case, the term "switching device" as used herein refers to that portion of a mechanism having one inlet and a plurality of outlets to a multiple, with a holding arrangement connected through locking contacts to the hold conductor of the inlet. For a stepping switch the inlet is the wipers, and the outlets are the bank contacts. For a crossbar mechanism, each "switching device" is the portion of the mechanism associated with one hold magnet, sometimes called a "vertical." For a crosspoint matrix, each "switching device" is one row having hold windings of the relays connected through their own contacts to a conductor connected to the hold conductor at the inlet for the row.

The switching network comprises an A stage for concentration, a B stage for distribution, and a C stage for expansion. Originating junctors O.J. are included in the links between the A and B stages, and terminating junctors T.J. are included in the links between the B and C stages. In addition an RA stage and an R stage in tandom provide for connections from the line terminals to registers and senders. Register junctors R.J. are provided in the links between the RA and R stages. The A stage, C stage, and RA stage all comprise switches mounted on the same gate for each 100-line group. The system provides for a maximum of 25 line groups of 100 lines each. Each of these switches mounted on a line group gate has its single inlet individually connected to one of the junctors, namely each A stage switch is connected to an originating junctor, each C stage switch to a terminating junctor, and each RA stage switch to a register junctor. The B stage comprises switches which have been split to provide two 1×25 matrices on a single switch, instead of a 1×100 matrix. Mounting 25 of these switches on a gate provides two 25×25 matrices. The R stage provides for distribution to connect any register junctor to any one of the registers or senders.

The registers each provide storage for the equipment number of the calling line to which it is connected when in use, and equipment to receive and store dialed digits, including equipment for timing and counting on a space-division basis.

The terminating junctors include the equipment required to supervise a connection once it is established including supply of transmission current, supply of ringing signals and ringback tone, with ringing for individual or party lines, provide for metallic cut through on trunk calls, and provide for reverting calls. Not all of the terminating junctors provide all of the possible features, but they are divided into classes as required.

Each of the network line terminals is provided with a three relay line circuit L.C. These terminals provide for service to all of the local lines and trunks, the trunks being a special class of line. The trunk lines in addition to their class of service marking, are provided with trunk circuits and trunk adapters as required. The trunks include several classes of incoming, outgoing and two-way trunks.

In addition to the line and trunk circuits there are also several service terminal circuits some of which are shown in FIG. 1 herein. These include a verification circuit 110, several test trunks 112 connected in multiple to a common test set 111, a service observation trunk circuit 114 which may be connected to a call selector 115 and the tape recorder 116. If the common test set 111 is located in a remote office, special trunk circuits and other equipment may be provided for establishing connections thereto.

Note that in the Duthie et al. patent only three-conductor lines are shown switched through the network, e.g., the transmission conductors +L and −L and the hold conductor C. As disclosed herein the local line circuits all have three-conductor appearances at the network but the trunk circuits and the special service circuits may have the fourth or extra control conductor EC provided.

Figure 3:
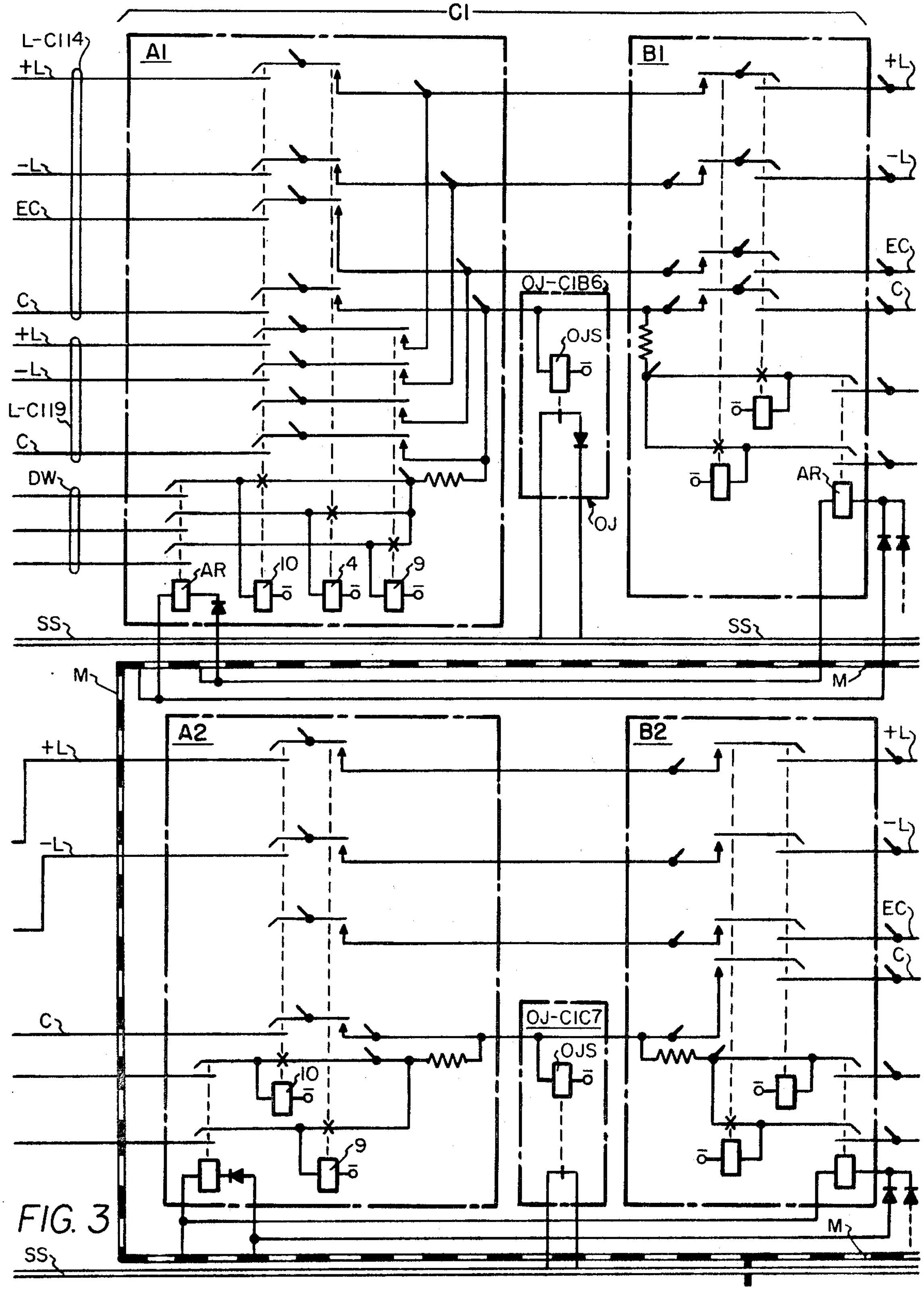

The full-network trunking plan for the system is disclosed in the Duthie et al. patent. A few of the possible connections are shown symbolically in FIG. 1. In this figure the switching devices such as A1 are represented symbolically by an arrow for the inlet, and a semicircle with lines thereto for the outlets. Some of the outlets of the switches are shown in the more detailed representation of FIGS. 2–7, these being shown by dots on the semicircle in FIG. 1. Referring, for example, to the switching device A1 as shown in FIG. 3, the inlet as shown is a four-conductor line at the right, and two outlets are shown at the left, one being four-conductor line L–C114 and the other being three-conductor line L–C119. The inlet is connected in multiple to 10 units lines within the switching device each extending to contacts of one of the 10 units relays. The drawing shows units relays 4 and 9. The line from each units relay is connected in multiple to the tens relays, relay 10 being shown. The outlet multiplies from the switch are bars as shown in the Boswau patent, and the moving springs of the tens relays contact these bars. The switching devices for the line circuits are also provided with 40 allotter bars, 20 being designated DW for connections to calling lines, and 20 being designated DZ for connections to called line circuits. Only a few of the allotter bars are shown in FIGS. 2–7. In each switching device, the allotter relay AR when operated connects all of the tens and units relays to corresponding bars DW and also to bars DZ. For each connection the marker supplies two signals to operate a tens relay and one signal to operate a units relay. Once the relays are operated they hold via their own contacts to the hold conductor C of the network.

Figures 2, 10:
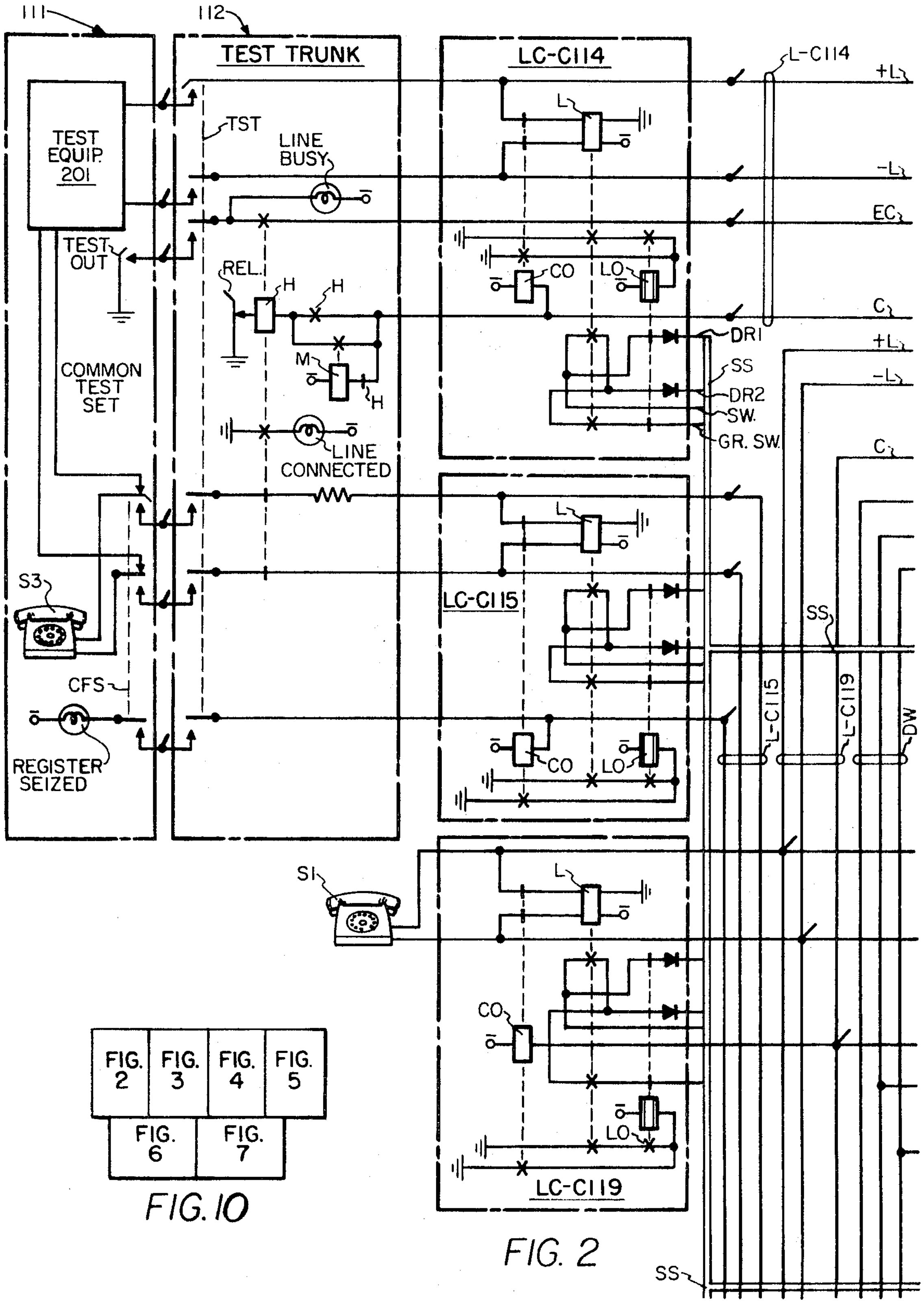
FIGS. 2–7 when arranged as shown in FIG. 10 comprise a schematic drawing of some of the circuits of FIG. 1.
Figure 5:
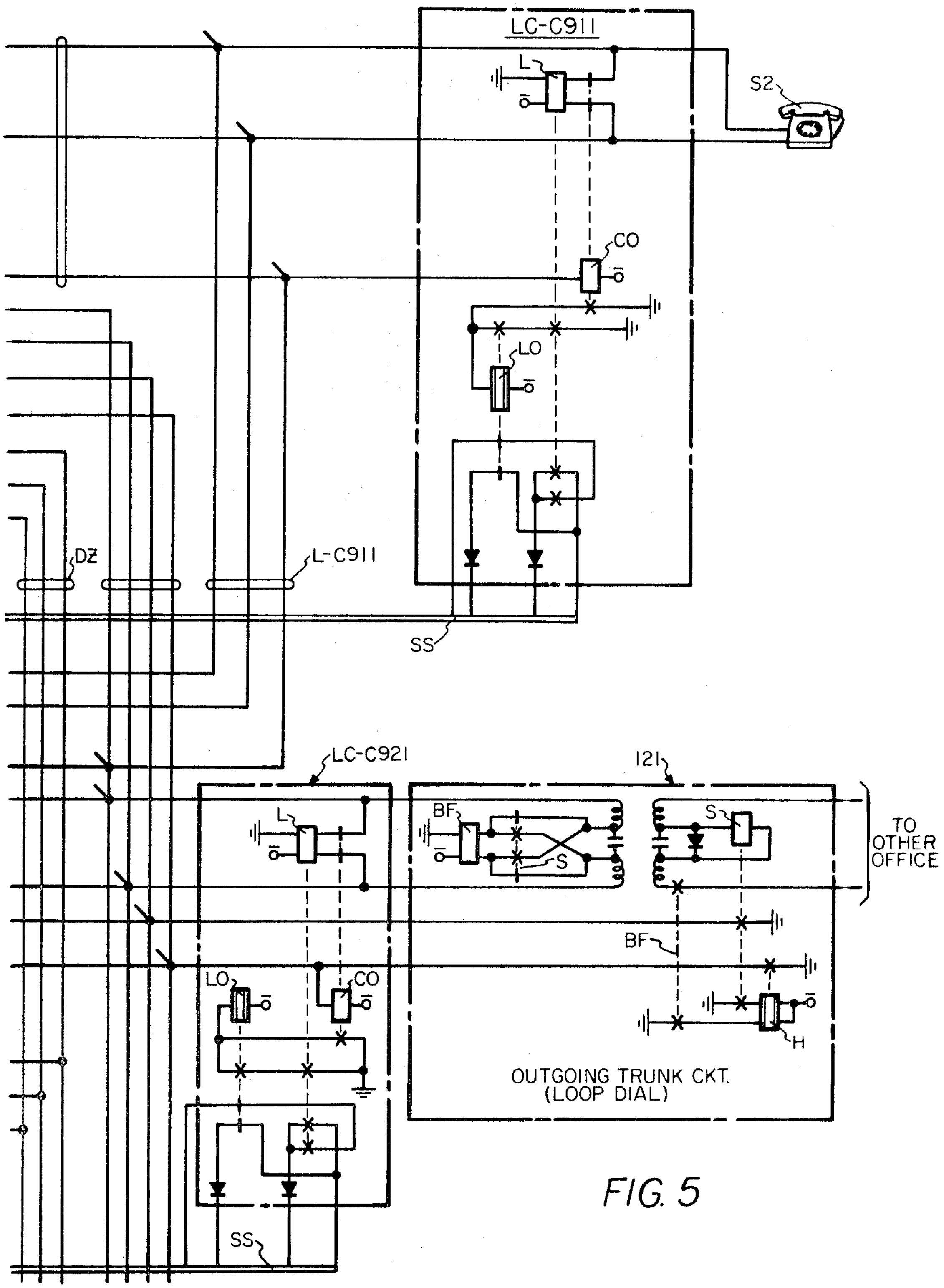
Figure 6:
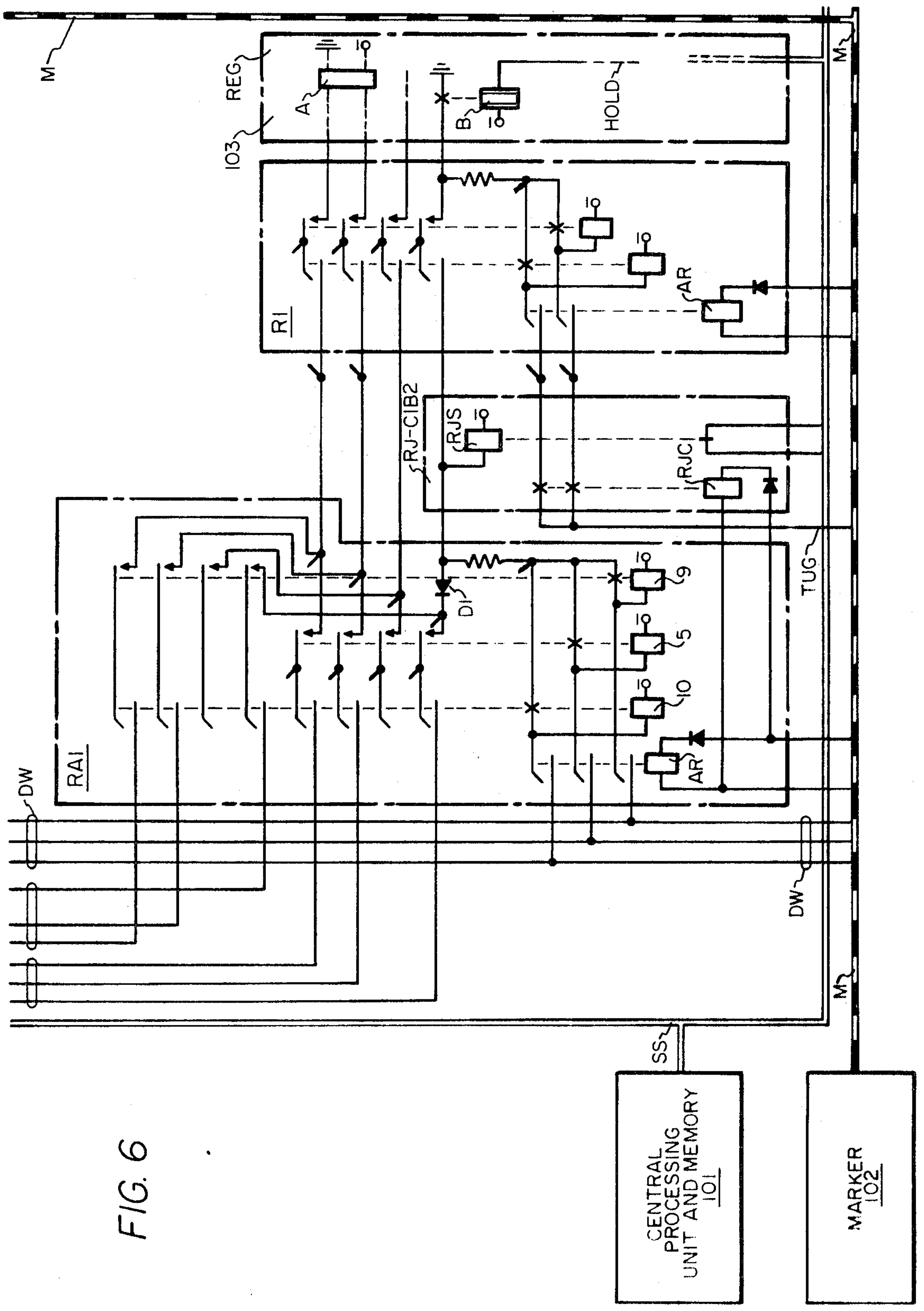
Figure 7:
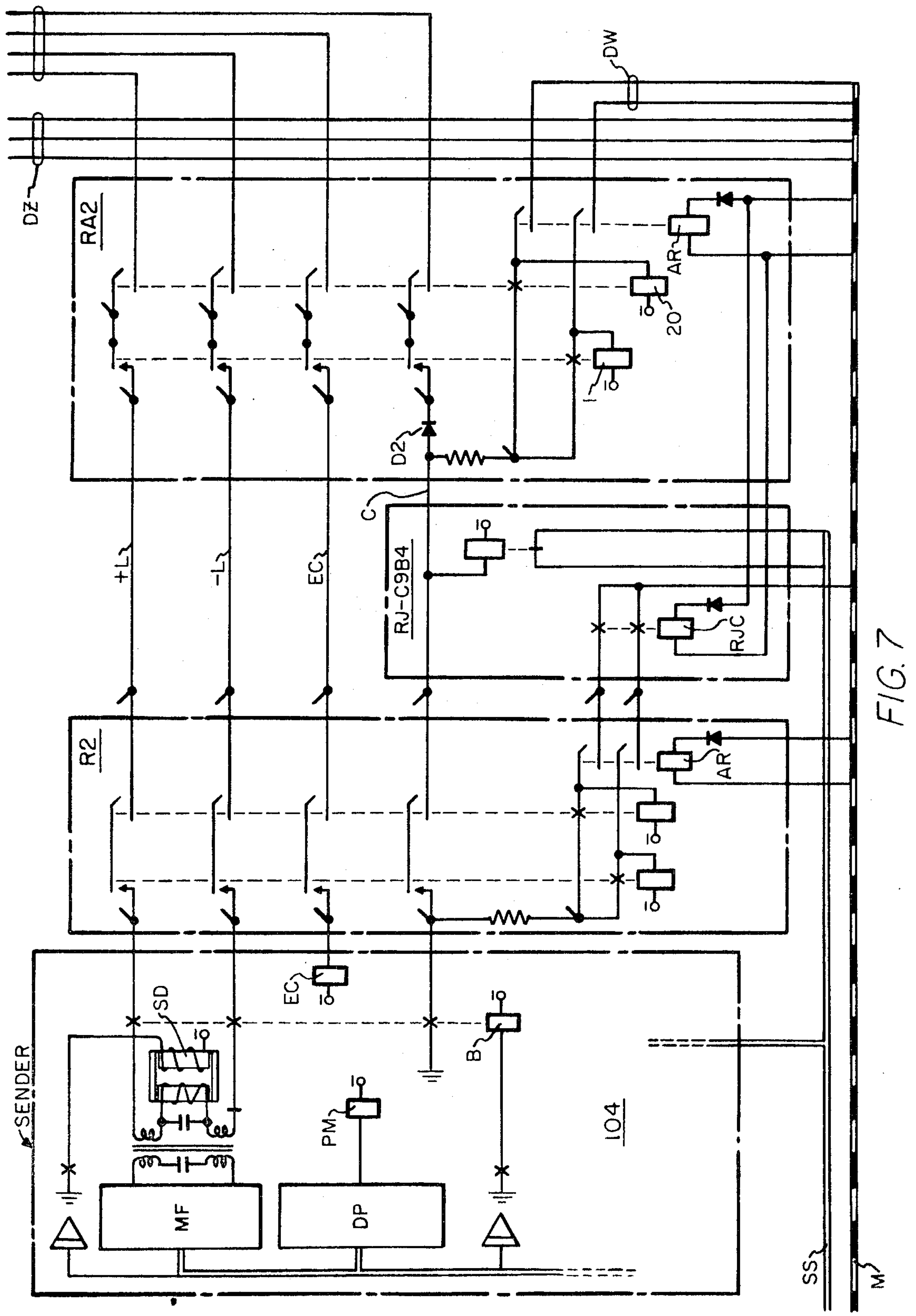

The line circuits, some of which are shown in FIGS. 2 and 5, each comprise three relays, a line relay L, a cutoff relay CO, and a lockout relay LO. The line relay is connected via contacts of the cutoff relay to the transmission conductors to operate when the loop is closed in the usual manner. The cutoff relay operates when ground is received on the hold conductor C from the switching network, thereby disconnecting the line relay and via make contacts supplying ground potential to operate the lockout relay. If for any reason the cutoff relay releases before the transmission loop is opened, the lockout relay locks up via its own contacts and contacts of the line relay. Contacts of the line and lockout relays are connected via the status conductors SS to the memory to provide status signals as fully described in the Duthie et al. patent. The different combinations of the line and lockout relay being operated indicate the four possible status conditions, namely idle, calling for service, busy, and lockout. The contact arrangement is the same as that disclosed in the Duthie et al. patent (an alternative embodiment provides break contacts such that an open circuit condition on both status conductors indicates a busy condition). It is of particular importance to note that for each line circuit there is a class of service stored in the common memory, which the central processor reads when it detects a call for service. For some of the trunk circuits, in particular for the special service terminal circuits, this class of service is used in determining how to establish the connections through the network. For example, some of the special service circuits are provided with two network line circuit terminals, one being used for connections to the register, and the other being used for main network connections to other line circuits. The central processor is programmed so that in recognizing the class of service of one of these circuits it establishes the register connection to the terminal identified as calling for service, and when ready to establish a main path it determines the proper terminal number and connects the path accordingly.

The junctor circuits connected in the links of the network provide for busy or idle status indications via the set of conductors SS to the memory. The originating junctors each comprise a single relay OJS connected to the hold conductor C which has a set of break conductors for the status indication, and the register junctors each have a corresponding relay RJS connected to the hold conductor and a set of break contacts for the status indication, and the register junctors each have a corresponding relay RJS connected to the hold conductor and a set of break contacts for the status indication. Note that in the Duthie et al. application the status contacts are make contacts, so that a busy junctor therein was indicated by a closed circuit, whereas herein it is indicated by an open circuit. The register junctors each also have a relay RJS which is connected in parallel with the allotter relay of the switch RA with which it is associated for extending ground potential to the switching device of the R stage to operate the appropriate tens and units relays therein.

Figure 4:
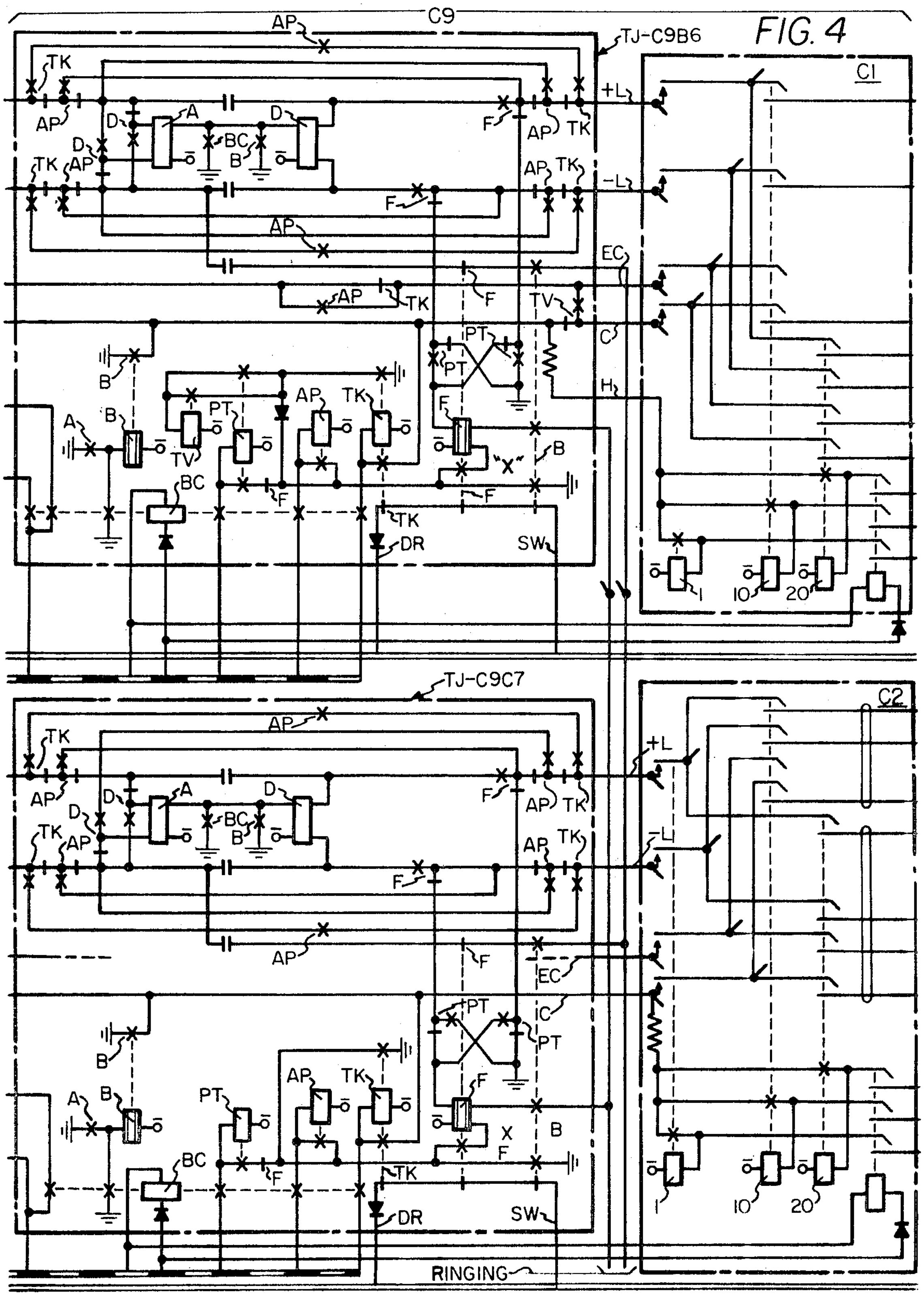

Typical terminating junctors are shown in FIG. 4. Each includes a transmission bridge comprising a relay A for the calling line side and a relay D for the called line side connected to the transmission conductors +L and −L, the calling and called sides being separated by capacitors. Operation of the back bridge relay D reverses the battery potential from relay A to the calling side of the circuit. A special relay AP is provided for reversing the terminating junctor for use in situations in which there are no idle paths available in the normal direction connecting the calling line via the A switch and the called line via the C switch. Operation of relay AP in response to a special instruction from the marker connects the A relay to the C switch and the D relay to the connection via the B and A switches.

For a trunk call, relay TK operated by an instruction from the marker provides a metallic path for the transmission conductors +L and −L through the junctor; a second function for the AP relay is to split the junctor when relay TK is operated. A second access from the marker during the call provides an instruction to operate the relay AP to switch the connection through. The extra control conductor if provided is also split by operation of relay TK and switched through by subsequent operation of relay AP. The hold path for relay TK extends via its own contacts to the hold conductor C.

A terminating junctor is seized by the marker by two signals which operate relay BC, contacts of which connect several conductors for marker operating potentials and junctor instructions to the marker. One set of contacts operates the hold relay B, and another pair of contacts extends ground potential to the allotter bars for the tens and units relays of the B switch associated with this junctor. The remaining contacts of the BC relay extend connections to instruction relays of the junctor which as shown herein comprise the trunk relay TK, the junctor reversing relay AP, and a party relay PT. Relay PT provides for reversing the ringing connection which makes possible two party lines with divided ringing. For junctors for use on calls to lines having more than two parties additional ringing control relays are provided with their windings connected via contacts of the relay BC to instruction conductors of the set of conductors M, with locking paths similar to that for relay PT. Relay PT locks via its own contacts, break contacts of relay F and make contacts of relay B to ground. Relay AP locks via its own contacts to the same ground connection via the contacts of relay B, or alternatively may be locked during trunk calls via ground from contacts of relay TK, which in the case of junctor TJ–C1B6 at the upper half of FIG. 4 extends through a diode. Ringing potential is supplied via contacts of relay B in the upper winding of relay F; and the ringback tone is similarly supplied via contacts of relay B, break contacts of relay F and a condenser to the calling line side. When the call is answered relay F operates and locks via its own preliminary make contacts to the ground connection via contacts of relay B. If relay PT is operated the ringing potential is reversed to the called line.

The connect relay BC for establishing a connection is operated for a short period to establish a network connection and operate the instruction relays, and then restores. On a local call relay B remains operated via make contacts of relay A and supplies ground potential to the hold conductor C, as well as the holding potentials within the junctor. Relay B may also be provided with a holding path (not shown) via contacts of relay D to a timed release circuit for called party release. The status of the junctor is supplied via the status conductors DR and SW through break contacts of relays TK, F and B, so that when any one of these relays is operated the junctor has a busy status.

According to a feature of the invention, some or all of the terminating junctors may be provided with a special relay TV for use during test and verification calls. On these calls the trunk relay TK is always operated to provide a metallic path, and the special instruction also includes operation of relay PT to provide an operate path for the relay TV via make contacts of relays PT and TK to ground. The relay TV then locks via its own contacts and contacts of relay TK. Relay AP must also be operated on these calls to switch through the metallic path for the transmission conductors and the extra control conductor.

Operation—Local Call

To place a call the subscriber of a local station such as station S1 removes his handset, thereby operating the line relay in the line circuit LC–C119. A set of contacts of the line relay completes a path via the status conductors to the memory so that when this line is addressed an indication of the call for service is provided from the memory to the central processing unit (the block 101 in FIG. 1) while scanning under the control of the program. The computer then examines the busy or idle condition of the path which can connect the calling line to a register. This process includes addressing the register junctors to determine their status via conductor group SS. The computer also finds an idle register, instructs the marker 102, and upon finding an available idle path instructs the marker as to the identity of the path and also sends instructions to the register, one of which is to supply dial tone. Assuming that register 103 is selected, the marker supplies instructions to operate the allotter relays of the switches RA1 and R1 and via the set of conductors DW supplies instructions to operate the tens relay 10 and the units relay 9 of switch RA1. Contacts of relay RJC in the register junctor RJ–C1B2 supply ground potential from conductor TUG to operate the corresponding tens and units relays of switch R1. In the register 103, relay A is connected t the transmission conductors, and relay B is operated via a path not shown to supply ground potential to the hold conductor C. This holds the tens and units relays of the switches RA1 and R1, and operates the cutoff relay CO in the line circuit LC–C119. Relay LO of the line circuit in turn operates, and the status of the line circuit becomes busy.

The subscriber at station S1 now dials a seven digit number, which it may be assumed is the directory number of station S2. During dialing the register calls for the service of the computer several times, and at the completion of dialing the computer determines the equipment number, which is C911 for the called line. The computer also scans the status of the originating and terminating junctors which may be used in the connection between these two line circuits and selects one of them. Two of the possible paths are shown in FIG. 1 and in FIGS. 3 and 4. One of these paths is via the originating junctor C1B6 and terminating junctor C9B6, which uses the switches A1, B1 and C1; and the other path is via originating junctor 0J–C1C7 and terminating junctor TJ–C9C7 which uses switches A2, B2 and C2. Note that there is a difference in the numbering of junctors with respect to that disclosed in the Duthie et al. patent. As disclosed herein the number of each originating and terminating junctor has the first two digits corresponding to the designation of the line group, and a final two digits which are the same for the set of originating junctors and terminating junctors. The status relay for the originating junctor is mounted with the equipment for the terminating junctor having the same number. There are several other possible paths between these two lines each path having the originating junctor in hundreds group C1 and a terminating junctor in hundreds group C9, and having the last two digits for these junctors identical. Assume that the computer selects the path via the junctors designated with the last two digits B6, which is via the switches A1, B1 and C1. The computer then supplies instructions via the marker to the set of conductors M to operate the allotter relays and switches A1 and B1 in parallel via two of the leads, and via another two leads supplies instructions to operate the BC relay of the terminating junctor and the allotter relay of the switch C1 in parallel. Potentials via two of the conductors of the set DW operates the tens relay 10 and the units relay 9 of switch A1, and similarly potentials via two of the conductors of group DZ operate the tens relay 10 and the units relay 1 of switch C1. The tens and units relays of switch B1 are operated via conductors of the BC relay of the corresponding terminating junctor. If station S2 were the second party on a line an instruction would be supplied to operate relay PT. Ground potential via contacts of relay B to the hold conductor C holds the tens and units relays of the three switches in the connection, operates the cutoff relay of the line circuit LC–C911 and supplies a second holding path for the cutoff relay of the calling line circuit LC–C119. The marker then releases, restoring the allotter relays and the terminating junctor BC relay.

The computer supplies an instruction to the register to release its B relay which removes the holding ground to restore switches RA1 and R1 in the connection from the calling line to the register. The diode D1 in the hold conductor of switch RA1 prevents the ground potential supplied by the B relay of the terminating junctor from extending back to the switches RA1 and R1.

In the terminating junctor the A relay is now operated via the loop from the calling line S1, and when the called line answers the D relay is operated via the loop thereto. The F relay operates and holds during the connection. At the end of the call the A relay restores and releases the relay B. This removes the holding ground to release all of the switches and cutoff relays in the path.

Operation—Outgoing Call

Assume now that the subscriber at station S1 initiates a call to a subscriber in another office. A connection to a register is established in the same manner as for a local call. The computer upon analyzing the first three dialed digits recognizes an exchange code for another office, and selects an outgoing trunk circuit in a group extending to that office. Assume for example that trunk circuit 121 is selected, which is associated with line circuit LC–C921. Assume further that a sender is required for this call. The computer scans the status of the senders and register junctors to select a path for the sender connection; and also scans the originating and terminating junctors to select a path between the calling line and the outgoing trunk circuit. Assume that sender 104 and register junctor RJ–C9B4 are selected, signals are supplied from the marker to operate the allotter relays of switches R2 and RA2, and via the set of conductors DW to operate the tens relay 20 and units relay 1 of switch RA2. Ground potential is also supplied via contacts of relay RJC of the register junctor to operate the tens and units relays of switch R2. A signal in the sender supplies ground potential via a relay driver to operate the hold relay B, which supplies ground potential to the hold conductor C to hold the tens and units relay of switches R2 and RA2, and to operate the cutoff relay of line circuit LC–C921.

The central processing unit also proceeds to select a path between the calling line and the outgoing trunk circuit. Assume for example that the path via originating junctor OJ–C1C7 and terminating junctor TJ–C9C7 is selected. Signals are then supplied from the marker to operate the allotters of the switches A2 and B2, and other signals operate the allotter switch C2 and the BC relay of the terminating junctor. The tens and units signals are supplied via cable DW to operate the tens relay 10 and the units relay 9 of switch A2 and via conductor DZ to operate the tens relay 20 and units relay 1 of switch C2. The tens and units relays of switch B2 are operated via ground through contacts of the BC relay of the terminating junctor. The instructions to the terminating junctor operate the relay TK. Note that the path through the junctor is split at the make contacts of relay AP.

In the sender a loop is completed via a winding of the shunt field relay SD and contacts of relay B to the transmission conductors +L and −L, which operates the relay BF in the trunk circuit 121. Contacts of relay BF complete a loop over the trunk line to the other office, and supply ground potential to operate the hold relay H.

The other office responds to the closed loop condition to establish a connection within the other office and reverses the battery potential on the line to operate relay S. Contacts of relay S are shown for reversing the battery potential from relay BF to the transmission conductors, and another set of contacts are shown for applying ground potential to the extra control conductor EC. Actually these are alternative options and only one of the signaling conditions need be used in a particular trunk circuit. If reverse battery signaling is used the potential is detected by the shunt field relay SD in the sender which operates. If ground potential via the extra control conductor EC is used it operates the relay EC in the sender. In either case a signal is supplied via contacts not shown to indicate that sending may commence. The sender may supply signals either from a dial-pulse generator DP which operates relay PM to interrupt the loop; or a multifrequency generator MF may be used to supply tone signals over the transmission conductors. Assume that dial pulse sending is used. The relay BF in the trunk circuit responds to the opening and closing of the loop from the contacts of relay PM; and contacts of relay BF repeat the dial pulses into the loop to the other office.

After sending is completed the marker supplies signals to the terminating junctor to operate the relay AP which switches through the connection. At this time ground potential from contacts of relay H in the outgoing trunk circuit hold the switches A2, B2, and C2 and the cutoff relays of the two line circuits.

According to a feature of the invention, the register connections and sender connections may now be released by signals which restore the B relays in the register 103 and the sender 104. The diodes D1 and D2 prevent the ground potential from the outgoing trunk circuit from extending to the register and sender connections, so that the switches RA1, R1, RA2, and R2 release at this time.

In the main connection, the ground on the hold conductor C holds the trunk relay TK in the terminating junctor, and ground potential via contacts relay TK holds the relay AP. At the end of the call the subscriber at station S1 hangs up to open the loop, which releases relay BF in the trunk circuit, thereby releasing the hold relay H. With ground removed from the hold conductor C the switches A2, B2, C2, the trunk relay TK in the terminating junctor, and the cutoff relays of the two line circuits restore.

Test Calls

A typical test trunk is shown in FIG. 2. A plurality of these trunks are connected in multiple to a common test set 111. Each of the trunks include a manual key TST which when operated connects it to the common test set. Each of the test trunks has two associated line circuits for network connections; because the original connection to a register must be a loop, and the final connection via the main network switches is required to be a monitor connection without a loop. For test trunk 112 the line circuit LC–C115 is used for the register connection, and the line circuit LC–C114 is used for the monitor connection. A relay H in the test trunk provides for changing from the loop to the monitor connection.

The common test set includes a telephone set S3 which may be used to dial for establishing the test connection. This telephone is provided without a ringer. To initiate a call the keys TST in the test trunk and CFS in the common test set are operated and the handset of the telephone S3 is taken off hook. This completes a loop to operate the line relay of line circuit LC–C115, which produces a call for service signal condition via the status conductors to the central processing unit and memory 101. In response thereto the marker finds an idle path and establishes a register connection which may, for example, extend through switches RA1, register junctor RJ–C1B2 and the switch R1 to the register 103.

Assume that station S2 is being called for test purposes. After dialing is completed the central processing unit determines the equipment number C911 of the called line, and also using the class of service of the test trunk determines that the connection is to be made to line circuit LC–C114. It is also determined that special instructions are to be supplied to the terminating junctor. Assume that the path via originating junctor OJJ–C1B6 and terminating junctor TJ–C9B6 is selected. The signals operate the switches A1, B1, and C1 and the BC relay of the terminating junctor as in the preceding call descriptions. The special instruction to the terminating junctor operates the relay TK, relay PT, and relay AP. This causes the special relay TV to operate. Upon release of the marker a metallic path extends through the terminating junctor for the transmission conductors +L and −L. In accordance with the invention the extra control conductor EC is connected via contacts of relay TV to the hold conductor C to line circuit LC–C911. The hold conductor from the calling side is connected through a resistor and conductor H to hold the tens and units relays of switch C1. The holding ground is initially supplied via contacts of relay B of the terminating junctor. Relay M in the test trunk 112 detects this ground potential and operates. Upon removal of the ground potential by the terminating junctor when the marker releases, the relay H operates via ground potential through the release key REL and the winding of relay H, and thence through make contacts of relay M and its own break contacts in series with relay M. When relay H operates it disconnects relay M. Relay H now holds via the battery potential from the tens and units relays and the cutoff relay, via its own winding to ground potential at the release key. This ground potential via the release key and the winding of relay H is the holding potential for the switches A1 and B1 and the relays of the terminating junctor, and also for switch C1. Contacts of relay H also open the loop path to the line circuit LC–C115 which thereby opens the path to the A relay in the register circuit 103. The register and the connection between it and the line circuit LC–C115 is released.

The extra control conductor EC is connected via contacts of relay H of the test trunk to a line busy lamp, and also to a "test out" switch of the common test set. If the called line is busy, ground appears on the hold conductor C at the line circuit LC–C911 which extends through switch C1 to the terminating junctor and thence via make contacts of relay TV to the extra control conductor EC through the switches B1 and A1 to light the line busy lamp in the test trunk. When the line is idle, tests may be conducted via the test equipment 201 of the common test set. Before making tests of the outside line between the line circuit LC–C911 and the station S2 the line relay of the called line circuit must be disconnected. This is accomplished by operating the "test out" key of the common test set which supplies ground potential via the extra control conductor, thereby operating the cutoff relay of the line circuit LC–C911. For inward tests the "test out" key is open and the loop between the transmission conductors is closed within the test equipment 201. This operates the line relay of the line circuit LC–C911, which initiates a call for service and causes a connection to be completed to a register as for any originating call.

The test connection is released by operation of key REL to remove the holding ground. Note that if the line is busy the test connection may be released independently of the regular connection existing to that line.

Verification Calls

Verification circuits are provided for toll, information, or repair operators, to check whether a line which is reported as continually busy by a customer is truly busy or out of order. Also, an operator can inform a busy subscriber of an emergency, important call waiting for him, or verifying the number of the calling subscriber. The verification circuit can be either of the type using nondedicated lines for connections to the operator; or may be of a dedicated type using either a one-way or two-way trunk line providing combined verification, information, and intercept service. A verification circuit of the nondedicated type is shown as circuit 110 in figs. 1 and 8. This circuit is provided with a line circuit LC–C912 for seizure by a connection through the switching network. It is also provided with a verification register access via a three-wire line circuit C112, and a verification line access via a four-wire line circuit, C111.

An operator situated in another office may make a verification call via any incoming trunk circuit 117 from that office, and then after a register connection is established from line circuit LC–C118 a special number may be dialed to reach the line circuit LC–C912.

In the verification circuit 110, the relay A acts as a pulsing relay. Relay B provides the holding ground for the incoming trunk. Relay C shunts out a relay RET to provide direct dialing to line equipment. Relay D is a loop reversal relay. Relay CR is a register connection detector. Relay RET provides a direct current loop for register seizure and a high impedance path when MF signaling is being used. Relay BT is a dial trap providing busy tone.

Figure 8:
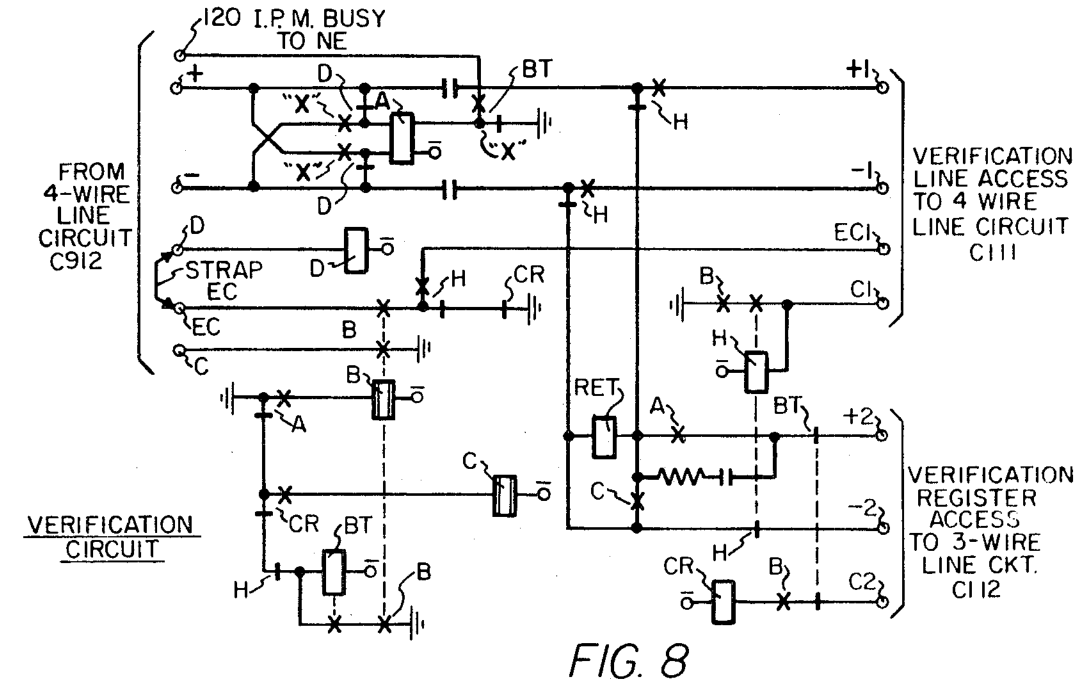
FIG. 8 is a schematic drawing of the verification circuit shown in FIG. 1.

When the circuit is seized by the loop across the + and − transmission conductors from line circuit C912, the relay A in FIG. 8 operates.

Relay A supplies operating ground for the hold relay B, and closes the loop that connects the 400-ohm winding of relay RET in series with the +2 and −2 transmission conductors, which initiate a call for service via the line circuit C112.

Relay B closes ground to the C lead for holding the connection between the incoming trunk line circuit LC–C118 and line circuit LC–C912. Other contacts of relay B prepare an operate ground for relay C, prepare the hold ground for relay BT, prepare the hold path for relay H and the hold ground to hold the equipment over the C1 lead, and closes relay CR to lead C2. Contacts of relay B also connect ground via break contacts of relays CR and H to the EC lead of the line circuit C912. The ground on this EC lead may either be supplied via a fourth conductor through the switching network if provided, or be connected via a strap to terminal D to operate relay D. If relay D is used it reverses the potential from relay A to the transmission conductors to provide supervision via the line circuit C912.

When a connection is completed from the register access line circuit C112 to a register, ground on lead C2 operates relay CR. Contacts of relays CR prepare an operating path for relay C, and disconnects the ground from the EC lead to line circuit C912 or relay D.

The incoming signals may either be in dial pulse form or multifrequency form. Assuming that dial pulses are received, relay A releases during each pulse and reoperates at the end of the pulse. Relay C operates via contacts relays CR, B, and A on the first dial pulse. Relays B and C are slow to release and hold during a train of pulses for a digit. Relay C operated provides a shunt path between the transmission conductors +2 and −2 to the register. When dialing is completed the central processing unit responds to the class of service condition to select line circuit C111, and assuming that station S2 has been dialed selects line circuit LC–C911 for a connection. Assume that the connection is established as for the test call via originating junctor OJ–C1B6 and terminating junctor TJ–C9B6. The marker as for a test call supplies the signals to operate the switches A1, B1, and C1, and supplies signals to the terminating junctor to operate the relays TK, PT, and AP. As for a test call relay TV is operated, which connects the extra control conductor to the hold conductor C of the called line circuit. Upon establishment of the connection, relay H detects the ground potential on the hold conductor C and operates. This relay is held via its own contacts and contacts of relay B to ground. This also supplies the holding ground for the network connection. Other contacts of relay H open the path to the +2 and −2 line to the register access, and connect the +1 and −1 leads of the verification line access line circuit C111 via the capacitors to the + and − transmission conductors of the line circuit C912. Contacts of relay H also disconnect the connection in lead −2 to the line circuit C112 to open the loop and thereby release the register connection. Ground will then be removed from lead C2 to release relay CR. Other contacts of relay H break the connection to prevent relay BT from operating. Finally, contacts of relay H extend the EC lead of line circuit C912 to lead EC1.

The extra control conductor provides for making the busy test at the called line circuit. If there is ground potential on the hold conductor C at the called line circuit, this is returned via the make contacts of relay TV of the terminating junctor and the EC lead to conductor EC1 of line circuit LC–C111, and thence via make contacts of relays H and B to lead EC at line circuit LC–C912. This ground is either forwarded via the EC lead through the network to the incoming trunk 117 or alternatively via the strap to operate relay D, in either case returning supervision to the incoming trunk circuit to indicate the busy condition.

Dial trap operation is provided in the verification circuit of FIG. 8 if dialing commences before the register is connected. On the first dial pulse when relay A releases ground is extended via contacts of relays A , B, CR, and H to operate the relay BT, which locks via its own make contacts and contacts of relay B to ground. Contacts of relay BT open the loop to the transmission conductors +2 and −2 of the register access line circuit C112 and opens the connection of relay CR to lead C2 to prevent operation thereof. Other contacts of relay BT which are of the make before break contact as indicated by an asterisk (*) connect a source of 120 I.P.M. busy tone to the winding of relay A and thence to the transmission conductor. On release, relays A and B restore, followed by relay BT restoring.

Service Observation Trunk Circuit

Figure 9:
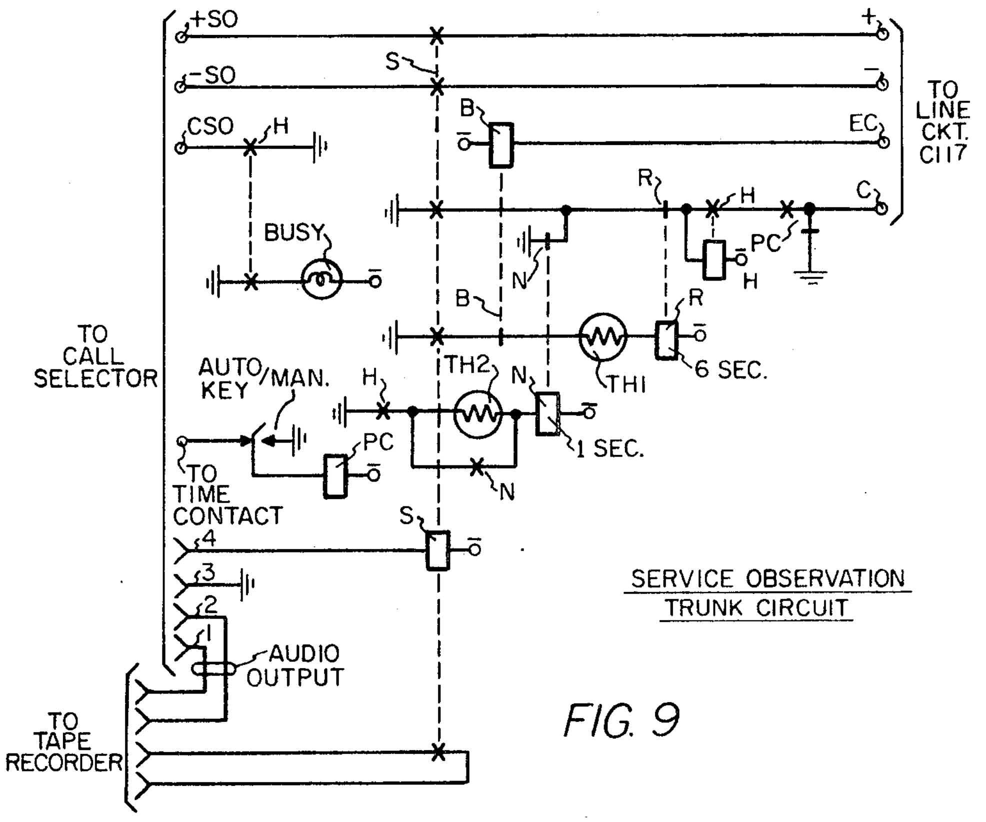
FIG. 9 is a schematic drawing of the service observation trunk circuit shown in FIG. 1.

A service observation trunk circuit 114 is shown in FIGS. 1 and 9. This trunk circuit operates with an Alston call selector 115 and a Uher tape recorder 116. This service provides Telephone Companies with a means of determining the quality of service provided by the telephone switching system, by monitoring and recording the details of calls being initiated and observing the correct completion of these calls.

In previously existing systems this type of observing was possible to a limited number of lines at any one period. A group of lines or links(25 maximum) were selected and monitoring connections made manually. Any one of these 25 points could be monitored for call progression.

This invention in conjunction with the Duthie et al. patent makes it possible for any line or incoming trunk in the telephone office to be service observed without the necessity of any manual connections.

Description Of Call Selector And Tape Recorder

The call selector is a unit which may search over 25 lines or links, which are selected for service observing, hence its name "Call Selector."

Its application in this invention however only utilizes one of the 25 points it could select. It is mainly used for its other features. It contains a high input impedance amplifier, a 1,000 cycle oscillator, a DC dial pulse detector, which converts the DC pulses to 1,000 cycle tone pulses, a polarity reversal (answer signal) detector, timer circuits and a start-stop control for the tape recorder.

The tape recorder is a regular monaural audio tape recorder with remote start-stop control features.

Service Observation Operation

The computer has the capability to determine under which conditions service observation connections are made. This is usually when a subscriber has just been connected to a register to initiate his call and when the Service observation trunk FIG. 9 is idle.

Assume that station S2, has just been connected to Register 103, via line C911, RA2 switch, RJ C9B4, and R1 switch.

The computer has recognized this fact and proceeds to instruct the Marker to set up a service observation connection, between the service observation trunk circuit via line circuit C117 and A1, B1, and C1 switches to line C911, it also supplies signals to terminating junctor C9B6 to operate relays TK, Pt, and AP. As for a test call, relay TV is operated, which connects the extra control conductor to the hold conductor C of the observed line circuit.

Upon establishment of the connection, relay H in FIG. 9 detects the ground potential on the hold conductor C and operates. This relay is held via its own contacts and contacts of relays N or S to ground. This also supplies the holding ground for the service observation network connection.

Relay H closes contacts to light a busy lamp, close a ground signal via CSO to signal the call selector that a new call is to be observed, it in turn responds with a contact closure between leads 3 and 4 which operates relay S. Contacts of S connect the + and − leads to the call selector amplifier via +SO, −SO, it provides a holding ground to the C lead in place of N which held the connection temporarily while the call selector was being signalled. The service observation connection is now under control of the call selector or relay R.

S relay also relays the signal from the call Selector to start the tape recorder drive mechanism.

All audio signals, dial pulses etc., detected at line C911 are now recorded on tape.

Assuming station S2 correctly dialled his call and was connected to the dialled number, by having a connection established from line C911 via Switches C2, B2, and A2 to line; say C119, TJ C9C7 would ring that line and ringback tone would be recorded. Assuming S2 station answers within 30 seconds (timed by call selector), TJ C9C7 returns a loop reversal which is detected by the call selector and starts a 10 second timer. During this time the initial conversation recorded will indicate whether or not the right connection has been set up. After 10 seconds the call selector will open a contact, between leads 3 and 4, and release relay S. Relay S will in turn release the service observation connection in the network by removing ground from the C lead, it stops the tape recorder drive and releases relay H. The trunk circuit will now idle line circuit C117 which in turn signals the computer via memory that another call may be observed.

The next call originated in the office will be connected.

Several special functions are built into the trunk circuit to facilitate proper recording of line busy tone encountered, non answered calls, congestion encountered, false seizures, time clock controlled service observing etc.

When the service observation connection was released, it was possible because of this invention which allows double connections to be made to a line via regular traffic carrying links, and yet be able to release each connection independently.

CONCLUSION

While FIG. 4 shows one of the terminating junctors provided with the special TV relay for test and verification calls, this feature may be provided in all of the terminating junctors. It must be provided in one or more terminating junctors of each hundreds group. Use of the test and verification feature with the extra control conductor connected to the hold conductor of the called line circuit has been illustrated with respect to a verification circuit 110, a test trunk 112, and a service observation trunk circuit 114.

If the common test set is located in another office a special test trunk and other equipment may be provided to extend the supervision and test paths either via dedicated facilities or regular switched trunk lines. It is to be understood that the feature may also be used with various other types of special service circuits, one example being automatic line routiner.

What is claimed is:

1. A communication switching system comprising:

a plurality of communication lines, some of which are trunk lines for outgoing calls;

a plurality of registers and a plurality of senders, a switching network having a main portion for selectively interconnecting said lines, and an auxiliary portion for selectively connecting lines to registers and trunk lines to senders, said network including a plurality of switching devices to switch in each connection a set of conductors including transmission path conductor means and a hold conductor, each of said lines having a network terminal circuit connected to a multiple to both portions of the network, each of said trunk lines also having a circuit with hold control means to apply holding potential to the hold conductor of its terminal multiple, each register and sender including hold control means to apply holding potential to the hold conductor, wherein each switching device comprises a single inlet and a plurality of outlets, contact means for connecting the transmission and hold conductors of the inlet to a selected outlet, setting means to operate the contact means to connect the inlet to a selected outlet, and hold means connected to the hold conductor of the inlet to hold the contact means after operation thereof, the auxiliary portion of the network having at least a terminal stage with the outlets of each of its switching devices connected to the multiples of individual terminals, and each of the switching devices of the auxiliary portion having a diode connected in series in the hold conductor between the connection to its holding means and said contact means, the diode being poled to prevent hold potential on the hold conductor of a terminal multiple from holding the switching devices of the auxiliary portion, while permitting hold potential from the auxiliary portion to extend to the hold conductor of the terminal multiple, a plurality of junctors in the main portion of the network, having switch-through relay means with a split condition in which the transmission conductor means is open, and a switched-through condition in which the transmission conductor means is metallically connected through the junctor, the hold conductor being connected through under both conditions;

network control means (marker 102) to supply operating potentials to said network-switching devices, and instructions to said junctors;

central processing apparatus for processing calls to establish network connections, including means to cause the network control means to supply operating potentials to establish a connection in said auxiliary portion from a calling one of said lines to a register, and to instruct said register to operate its hold control means to hold the connection; means subsequently effective to cause the network control means to supply operating potentials to establish a connection in said auxiliary portion from a sender to one of said trunk line terminal circuits, and to instruct said sender to operate its hold control means to hold the connection, and means to cause the network control means to supply operating potentials to establish a connection in said main portion from said calling line via one of said junctors to said trunk line terminal circuit, with the junctor in said split condition, the hold control means of the trunk being operated to hold the connection in the main portion; and means subsequently effective to instruct said register and said sender to each release their hold control means to thereby remove the hold potentials from the respective hold conductors to release the respective register and sender connections in the auxiliary portion, said diodes being effective to prevent the hold potential from the trunk line terminal from holding these auxiliary portion connections, and means to cause the network control means to instruct said junctor to change from the split condition to the switched-through condition.

2. A communication switching system as claimed in claim 1, wherein each said network terminal circuit includes a cutoff relay connected to the hold conductor of its said multiple, and wherein hold potential on the hold conductor from either the auxiliary portion or the main portion of the network operates and holds the cutoff relay.

3. A communication switching system as claimed in claim 2, wherein said junctors in the main portion of the network are terminating junctors, each having local-call circuits including a transmission bridge and ringing control circuits, the local-call circuits having calling side and called side connections to said transmission path conductor means;

a reversing relay (AP) for reversing the calling and called side connections of the local call circuits;

a trunk-call relay (TK) for disconnecting the local call circuits from the transmission path conductors;

wherein the initial instructions to the junctor for said connection through the main portion of the network to said trunk line terminal circuit includes an instruction which operates the trunk-call relay to thereby establish said split condition, and said means to cause the network control means to instruct said junctor to change from the split condition to the switched-through condition comprises instructions to operate said reversing relay, the switched-through condition path for the transmission path conductor means comprising a metallic path through contacts of the trunk-call relay and the reversing relay;

wherein the trunk call relay is held via a connection through its own contacts to the hold conductor, and the reversing relay is held via contacts of the trunk-call relay on said call to a trunk line terminal circuit, the reversing relay when used on a call terminating to a local line terminal circuit being held via contacts of a relay of the local-call circuits.

4. A communication switching system as claimed in claim 3, wherein said main portion of the network includes an extra control conductor extending through the switching devices and junctors for calls to said trunk line terminal circuits, and wherein there are contacts on said trunk-call relay to split the extra control conductor for the split mode, and there are contacts on the reversing relay to complete a path via the extra control conductor in the switched-through condition.

5. A communication switching system as claimed in claim 4, wherein at least one of said junctors further include apparatus for a test mode, including a test-call relay;

wherein said local-call circuits include a party relay for controlling the side of line of ringing, and instructions for the test mode from said network control means operate the trunk-call relay and the party relay, said test-call relay being operated via contacts of the party and trunk-call relays, and locking via its own contacts and contacts of the trunkecall relay; contacts of the test-call relay being used to control connections of the extra control and hold conductors for the test call mode.

6. A call-supervisory junctor for use in a communication switching system having a switching network with the junctor included between a first and a second section of the switching network, each section being arranged to switch transmission conductors and a hold conductor connected to holding means for the switches in each section, the first section being also arranged to switch an extra-control conductor;

said junctor being equipped to provide service for both normal calls and test calls;

the improvement in said junctor comprising test-call mode means effective during a test call to split the hold conductor and to connect the extra-control conductor from the first section to the hold conductor of the second section, with the holding means for the switches in the second section remaining connected to the hold conductor of the first section.

7. A call-supervisory junctor as claimed in claim 6, wherein said communication switching system in which it is used includes network control means (marker 102) for controlling the operation of the switching network and for supplying junctor instructions, the junctor having a plurality of modes and conditions of operation which are set in accordance with the instructions, means to apply hold potential to the hold conductor in the junctor during receipt of instructions;

wherein said test-call mode means includes a test-call relay which is operated in response to test-call instructions from the network control means, the test-call relay having a set of break contacts in said hold conductor between the first section and the second section, the holding means for the switches in the second section being permanently connected to the hold conductor of the first section, and the test-call relay having a set of make contacts for connecting the extra control conductor from the first section to the hold conductor of the second section.

8. A call-supervisory junctor as claimed in claim 7, wherein one of said modes is a trunk call-mode, and wherein the junctor includes trunk-call relay means which in response to trunk-call instructions from the network control means provides a metallic path for the transmission conductors between said first and second sections of the switching network, and wherein said test-call instructions include instructions for operation of the trunk-call relay means as well as for operation of the test-call relay.

9. A call-supervisory junctor as claimed in claim 8, wherein said modes further include a local-call mode, wherein the junctor includes local-call circuits including at least one relay which may be operated for said local call conditions by instructions from the network control means, and wherein the instructions for the test-call mode includes instructions for operating the trunk-call relay means and said one relay of the local-call circuits, the test-call relay being operated via contacts of the trunk-call relay means and said one local-call relay and locked via contacts of the trunk-call relay means.

10. The combination as claimed in claim 7, wherein said communication switching system includes a plurality of network terminal circuits including local line circuits having appearances on both the first and second sections of the network, each local line circuit including a cutoff relay connected to the hold conductor for operation in response to a hold potential thereon;

wherein for normal calls terminating at a local line circuit said junctor places holding potential on the hold conductor of the first section which holds the switches of both the first and second sections and the cutoff relays of the line circuits connected to each section of the network;

wherein some of the said network terminal circuits are test-mode terminal circuits having detection means connected to said extra control conductor which via the connection through the first section of the network and the contacts of the test-call relay of the junctor to the hold conductor of the second section detects the presence of hold potential at a local line circuit to which a test-mode call has been established.

11. The combination as claimed in claim 10, wherein one of said test-mode terminal circuits is connected to a test trunk for connection to a test set which includes means to supply holding potential to the extra control conductor, which via the connection through the junctor to the hold conductor to a local line circuit connected to the second section operates the cutoff relay, the local line circuits including a line relay which is normally connected to the transmission conductors through break contacts of the cutoff relay so that the line relay is disconnected from the transmission conductors upon operation of the cutoff relay.

12. The combination as claimed in claim 11, wherein said test trunk includes a hold relay and a connection-detect relay, each having a winding and a plurality of contacts, the winding of the connection-detect relay being connected between the source of potential on one side and on the other side via break contacts to the hold relay to the hold conductor, the winding of the hold relay being connected in a series path from a source of hold potential via a release key on the one side, and on the other side via a set of its own make contacts to the hold conductor, the last set of contacts being shunted by a set of make contacts to the hold conductor, the last set of contacts being shunted by a set of make contacts of the connection-detect relay, so that when a connection from the test-mode terminal circuit is completed the hold potential from the junctor operates the connection-detect relay, which competes a path for operation of the hold relay, and upon operation of the hold relay the connection-detect relay is disconnected.

13. The combination as claimed in claim 10, wherein one of said test-mode terminal circuits is connected to a verification circuit, which includes a hold relay having a winding connected directly to the hold conductor for operation upon establishment of a connection, the hold conductor being also connected via contacts of he hold relay and other relays to holding potential;

and wherein the extra control conductor from the terminal circuit is connected via contacts of the hold relay and other relays to said detection means, providing a busy test for a local line circuit to which a test-mode connection has been established.

* * * * *